US006223540B1

(12) United States Patent
Egermeier

(10) Patent No.: US 6,223,540 B1
(45) Date of Patent: May 1, 2001

(54) GAS PROCESSING TECHNIQUES

(75) Inventor: John Egermeier, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/340,064

(22) Filed: Jun. 25, 1999

(51) Int. Cl.[7] .................................................. B01D 8/00
(52) U.S. Cl. .......................................................... 62/55.5
(58) Field of Search ................................................ 62/55.5

(56) References Cited

U.S. PATENT DOCUMENTS 5,513,499 * 5/1996 DeRijke ................................ 62/55.5
5,855,118 * 1/1999 Lorimer ................................ 62/55.5

* cited by examiner

Primary Examiner—Corrine McDermott
Assistant Examiner—Malik N. Drake

(74) Attorney, Agent, or Firm—Albert J. Dalhuisen

(57) ABSTRACT

The present invention provides techniques for processing effluent gases from vacuum fabrication processes. The effluent gases are condensed on cold surfaces (512 and 514) inside a novel pump (220) resulting in a high vacuum. The pump (220) can be connected to a vacuum fabrication processing chamber (210) and to a turbo molecular pump (275). The condensate which is formed on the cold surfaces of the pump (220) is subsequently evaporated to form regenerated gases during the regeneration of the pump. A pressure vessel (280) is removably connected to the pump during regeneration, causing the regenerated gases to fill the pump and the pressure vessel at pressures ranging from about 10,343 torr (200 psi) to about 103,430 torr ( 2,000 psi). The pressure vessel is closed when substantially all condensate has evaporated. The vessel containing regenerated gases can then be connected to an on-site or to a remote gas treatment facility for removal of noxious substances. In an additional embodiment, an effluent gas processing system (610) is provided, including a controller (600) which is adapted for interacting with a plurality of unit operations (620, 622, 624, 626 and 628) of the novel gas processing techniques.

33 Claims, 3 Drawing Sheets

GAS PROCESSING TECHNIQUES

FIELD OF THE INVENTION

The present invention relates to gas processing techniques employing condensation on a cold surface in vacuum.

BACKGROUND OF THE INVENTION

Vacuum processing techniques are employed in many fabrication techniques, such as for example semiconductor fabrication. Examples of vacuum fabrication techniques include thin film deposition, etching and surface preparation. These techniques employ a variety of processing gases. Additionally, gases can be formed as by-products of these techniques. Many process and by-product gases are toxic, combustible or corrosive. Consequently, vacuum fabrication techniques generally require treatment of the effluent gases to remove noxious substances.

An example of a conventional vacuum fabrication system, including treatment of effluent gases is schematically illustrated in FIG. 1, showing vacuum fabrication system 100. A conventional vacuum fabrication chamber 110 is provided with a process gas inlet 112 and a vacuum outlet 114. Vacuum fabrication chambers are typically equipped with one or more vacuum gauges (not shown) and one or more temperature gauges (not shown). Ports (not shown) can also be provided, for example, to introduce purge gas into the chamber. These chambers are typically equipped with a load-lock chamber (not shown) to introduce a substrate into the fabrication chamber while keeping the fabrication chamber under vacuum.

Vacuum fabrication systems employ one or more vacuum pumps to obtain the required vacuum level and to remove process gases and by-product gases from the system. Pump selection is generally determined by the required vacuum level and the type and throughput quantities of the various gases as well as the potential for process contamination by pump substances such as pump oils. FIG. 1 illustrates a prior art vacuum fabrication system 100 including a conventional vacuum pump system 140. Typical conventional vacuum pump systems include a single vacuum pump, such as a mechanical pump, or a combination of for example two vacuum pumps. Such conventional pump combinations can include a turbo molecular pump in series with a mechanical roughing/backing pump or a cryopump in parallel with a roughing/backing pump. Cryopumps (also known as cryogenic pumps) trap molecules on a cold surface in high vacuum generally ranging from about $10^{-1}$ torr to about $10^{-10}$ torr, while turbo molecular pumps achieve high vacuum by expelling molecules through collisions between the molecules and turbine blades spinning at high speeds. Roughing/backing pumps include displacement pumps which are initially used to rough out the fabrication chamber before vacuum fabrication is started and which can subsequently be used to remove effluent gases. Systems, such as system 100, typically employ components (not shown) such as isolation valves, throttle valves, pressure gauges, temperature gauges and one or more forelines for process control.

Conventional cryopumps condense effluent process and by-product gas molecules on one or more cold surfaces at temperatures ranging from about 100 K to about 7 K. At about 10 K, all gases except helium and hydrogen condense on the cold pump surface resulting in high vacuum and in containment of all condensable effluent substances other than helium and hydrogen. Cryopump helium and hydrogen condensation requires the use of adsorption materials. The gas condensation process forms solid and/or liquid condensate on the cold surfaces of the cryopump. This process is continued until the pump efficiency starts to decrease. At this point, the pump is regenerated by increasing the pump temperature to evaporate the condensate. The regenerated effluent gases are then treated in treatment facility 140 (FIG. 1) which includes such treatment processes as reclamation, dry scrubbing, wet scrubbing, or combustion followed by dry or wet scrubbing. The remaining non-noxious gases can then be vented into the atmosphere.

The noxious gas treatment techniques of system 100 require that the gas treatment facility for removing noxious substances from regenerated gases is physically connected to the vacuum pump system and thus to the vacuum fabrication process. Consequently, each vacuum fabrication location requires its own treatment facility to which several vacuum fabrication processes may be connected. Also, vacuum fabrication processes which are at the same location may require different treatment facilities if these fabrication processes do not have similar noxious gases. The need for local treatment facilities precludes the economies of scale which can be realized if gases originating at several remote vacuum fabrication facilities can all be treated at one location for centralized gas treatment. Also, changes in gas treatment processing methods or equipment are more effectively made at a centralized treatment facility.

Accordingly, a need exists for cost effective, improved processing techniques for treating vacuum fabrication effluent gases.

SUMMARY OF THE INVENTION

The present invention provides novel processing techniques for treating vacuum fabrication effluent gases which overcome the prior art problems described above.

In one embodiment of the present invention, gases are condensed on a cold surface in a pumping chamber of a pump adapted for chamber pressures of at least about 10,343 torr (200 psi), preferably for pressures of about 103,430 torr (2,000 psi). The gases are condensed at a pressure which is below atmospheric pressure. Typically, the temperature of the cold surface ranges from about 7 K to about 20 K, while the pressure in the pumping chamber typically ranges from about $10^{-1}$ torr to about $10^{-10}$ torr. The pumping chamber is closed when the efficiency of the gas condensation process starts to decrease as a result of the formation of a substantial layer of liquid and/or solid condensate on the cold surface. The cold surface is then warmed, causing the evaporation of the condensate, resulting in the formation of regenerated gases. The regenerated gases cause a pressure increase inside the pumping chamber. The pumping chamber is opened to a vessel, for example a high pressure vessel, when the pressure inside the chamber reaches a predetermined level, such as atmospheric pressure. Evaporation of condensate is continued until substantially all condensate has evaporated to form regenerated gases. Condensate evaporation generally results in high pressures, typically ranging from about 10,343 torr to about 103,430 torr, inside the pumping chamber and inside the vessel. The vessel and pumping chamber are then closed, after which the vessel can be separated from the pumping chamber. Noxious substances in the regenerated gases which are isolated in the vessel can subsequently be subjected to treatment, on-site or at a remote location, in order to remove the noxious substances. Advantageously, the inventive technique thus results in a gas treatment process wherein vacuum process gases and by-product gases can be treated at a remote location, for removal of noxious substances.

In another embodiment of the present invention, an additional cold surface is employed inside the pumping chamber, preferably adapted for cooling at temperatures ranging from about 50 K to about a 100 K, for more effective gas condensation.

In still another embodiment of the present invention, the pumping chamber is provided with a housing including an inner housing adapted for chamber pressures ranging from about $10^{-10}$ torr to atmospheric pressure and an outer housing adapted for inside pressures ranging from atmospheric pressure to at least about 10,343 torr and preferably to about 103,430 torr.

In still another embodiment of the present invention a vacuum fabrication process is provided which includes a novel effluent gas containment system wherein the novel pump is connected to a vessel, preferably a pressure vessel.

In another embodiment of the present invention, a novel gas processing system is provided for processing vacuum fabrication effluent gases. The system includes a controller, such as a computer, which is adapted for interacting with a plurality of unit operations for processing these gases. Operative links provide bidirectional connections between the controller and the unit operations. A data structure, such as a computer program causes the controller to control the unit operations. The data structure can be provided on a removable electronic storage medium.

DETAILED DESCRIPTION OF THE INVENTION

While describing the invention and its embodiments, certain terminology will be utilized for the sake of clarity. It is intended that such terminology includes the recited embodiments as well as all equivalents.

Figure 1:
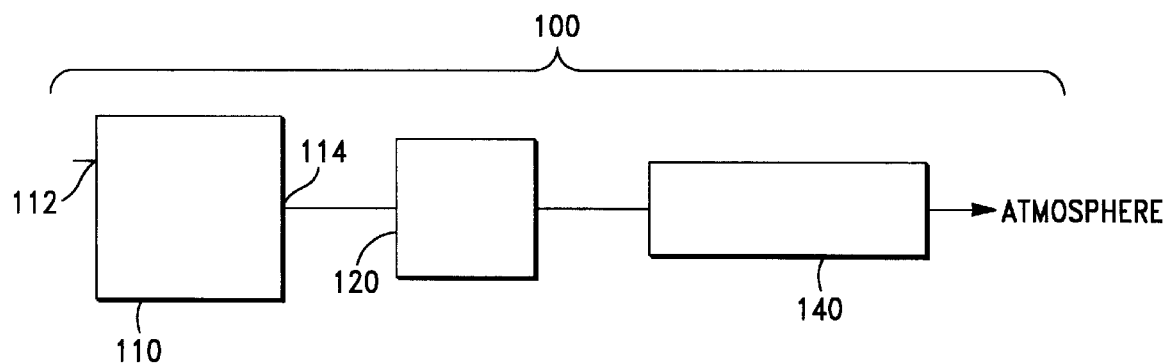
FIG. 1 is a block diagram illustrating a prior art process for vacuum fabrication and processing of effluent gases.
Figure 2:
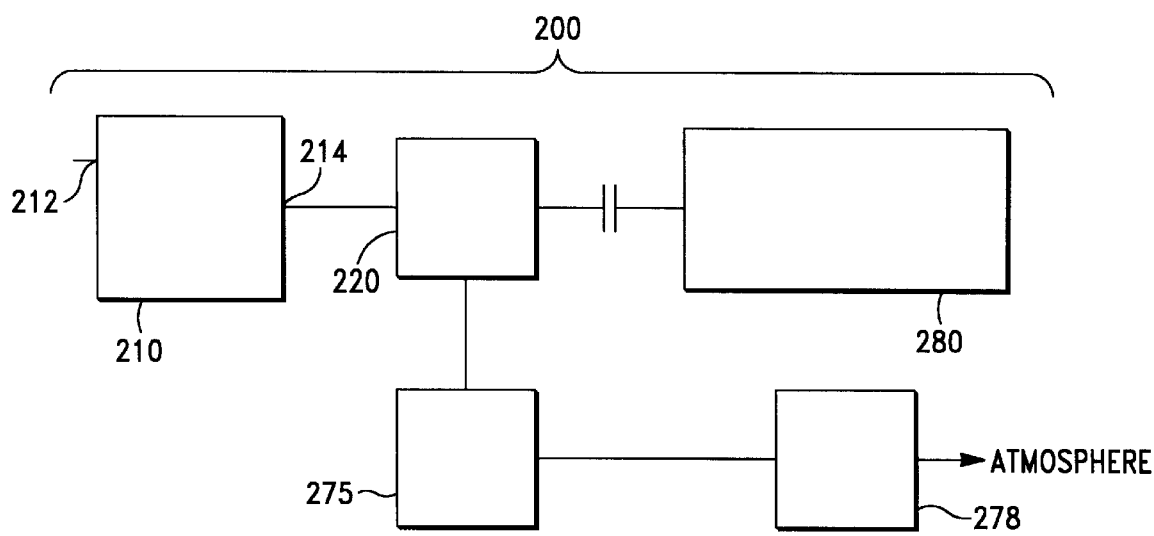
FIG. 2 is a block diagram illustrating an embodiment of the present invention showing a process for vacuum fabrication and processing of effluent gases.

In accordance with the present invention, novel techniques have now been discovered for treatment of noxious gases which are condensed inside novel pumps. One embodiment of the present invention is illustrated in FIG. 2, showing novel vacuum fabrication system 200. Conventional vacuum fabrication chamber 210, having inlet 212 and outlet 214, is similar to conventional vacuum chamber 110 described in connection with FIG. 1. System 200 employs three vacuum pumps in series: novel pump 220 which will be described more fully in connection with FIGS. 4 and 5, conventional turbomolecular pump 275 and conventional roughing/backing pump 278.

Figure 3:
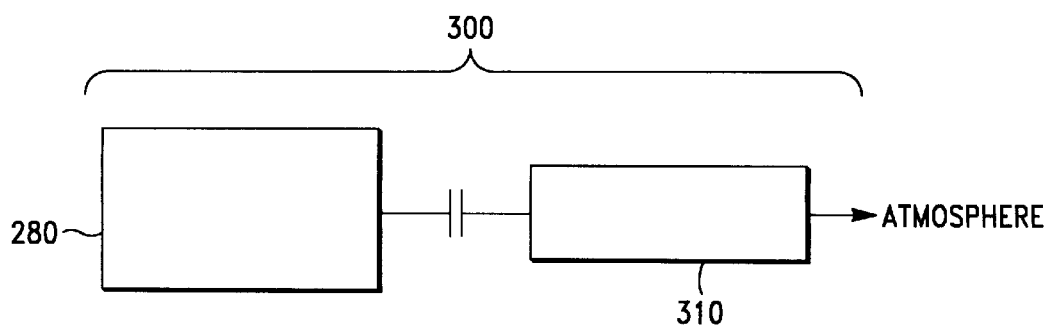
FIG. 3 is a block diagram illustrating an embodiment of the present invention showing a gas treatment system.

A vessel, such as a pressure vessel 280 (FIG. 2) is removably connected to novel pump 220, as will be described more fully in connection with FIG. 4. Gases are condensed inside pump 220 during the vacuum pumping process, forming a condensate. The condensate is subsequently evaporated to form regenerated gases. Regenerated gases are then transferred to pressure vessel 280, as will be described more fully in connection with FIG. 4. Vessel 280 containing these gases can be removed from the pump. The regenerated gases which are contained in the vessel can be treated to remove noxious substances either on-site or at a remote location as is schematically illustrated in FIG. 3, showing treatment system 300. This treatment system employs a conventional treatment facility 310, similar to treatment facility 140 (FIG. 1), which is operably connected to gas containing vessel 280. Gases from vessel 280 are transferred to treatment facility 310 for removal of noxious compounds using conventional treatment processes such as are well known to those of ordinary skill in the art. The treatment processes can include reclamation, dry or wet scrubbing, or combustion followed by dry or wet scrubbing. Non-noxious substances can then be vented to the atmosphere or disposed of in other conventional ways, such as are well known to those of ordinary skill in the art.

Figure 4:
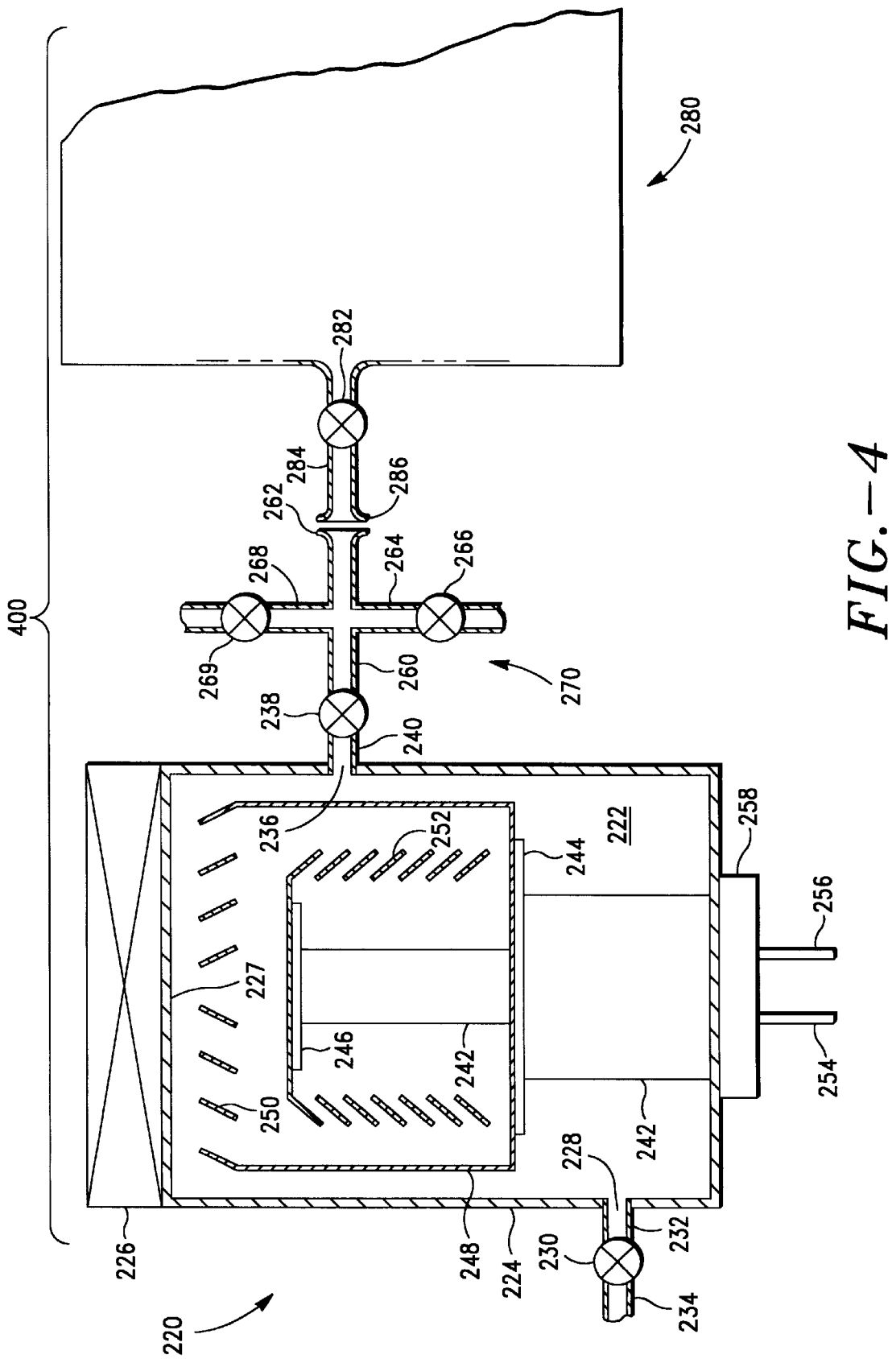
FIG. 4 is a schematic view of a pump of the present invention and a vessel, illustrated in FIG. 2, showing a gas containment system of the present invention.

Condensable gas containment system 400 of the present invention, depicted in FIG. 4, includes novel pump 220 which is operably connected to a vessel such as a pressure vessel 280. Pump 220 has an inner space 222, contained within a housing 224. This housing forms the pumping chamber of pump 220. Conventional cryopump housings are adapted for low pressure use, wherein the pressure of inner space 222 typically ranges from about $10^{-10}$ torr to about 760 torr (1 standard atmosphere). In accordance with the present invention it has now been found that novel pump housings adapted for inner space pressures ranging from about $10^{-1}$ torr to at least about 10,343 torr (200 psi), and preferably to about 103,430 torr (2,000 psi), advantageously adapt the pump for containment of condensable gases, particularly when the pump is used in conjunction with for example a vessel, such as a pressure vessel. More preferably, the novel pump housing is adapted for inner space pressures as low as $10^{-10}$ torr.

Housing 224 communicates with valve 226 through a housing port 227. Valve 226 communicates with a vacuum fabrication chamber, such as chamber 210 shown in FIG. 2. Alternatively, valve 226 (FIG. 4) can communicate with a foretube which is operably connected to the vacuum fabrication chamber. Typically, valve 226 is attached to pump 220 by means of flanges (not shown) on the valve and the pump. A port 228 in housing 224 is operably connected to a valve 230, for example by means of a conduit 232. Conduit 234 extending from valve 230 communicates with turbomolecular pump 275 (FIG. 2). A port 236 (FIG. 4) in housing 224 communicates with valve 238, for example by means of a conduit 240. Valve 238 is adapted for operably connecting inner space 222 to pressure vessel 280.

A conventional cryopump refrigerator 242 is mounted inside housing 224. Exemplary refrigerator 242 includes first and second refrigeration stages 244 and 246 respectively. Temperatures at the first refrigeration stage typically range from about 50 K to about 100 K, while second stage temperatures typically range from about 7 K to about 20 K, preferably ranging from about 7 K to about 12 K. Typically, a bucket shaped thermal radiation shield 248 is attached to first refrigeration stage 244 such that there is effective heat transfer between the shield and stage 244. Shield 248 has a conventional inlet array 250. Second stage 246 is positioned inside shield 248 and inlet array 250. Usually, a conventional second stage array 252 is connected to second refrigeration stage 246 such that there is effective heat transfer between array 252 and second stage 246. Arrays 250 and 252 provide the pumping surfaces of inventive pump 220. Refrigerator 242 operates in a conventional manner, for example by expanding helium gas which is introduced under pressure through inlet conduit 254. Expanded helium gas is exhausted through outlet conduit 256 for return to a conventional compressor (not shown). Pump 220 optionally utilizes a base 258 to support the pump housing and/or to provide helium gas pressure valves and pump controls. Additionally, this pump can be provided with conventional components (not shown) such as pressure and temperature sensors and additional ports. Suitable materials of construction for housing 224 include Hastelloy alloys.

A conduit 260 (FIG. 4) extends from valve 238 to a conduit connection 262. Optionally, a conduit 264 having a valve 266 and a conduit 268 having a valve 269 extend from conduit 260, as depicted in FIG. 4. A manifold 270 includes valves 238, 266 and 269, and conduits 260, 264 and 268. As illustrated in FIG. 4, pressure vessel 280 is provided with a valve 282, operably connecting vessel 280 to manifold 270. A conduit 284 extends from valve 282 to a conduit connection 286 which forms a mating connection with conduit connection 262 of manifold 270. Typically, mating connections 262 and 286 utilize flanges which are clamped or bolted together to provide a pressure seal adapted for pressures ranging from about 760 torr (1 standard atmosphere) to at least about 10,343 torr (200 psi) and preferably for pressures of about 103,430 torr (2,000 psi). The space inside the vessel comprises a separate gas containment space.

Novel pump 220 (FIG. 4) is operated to pump high vacuum by condensing gases on arrays 250 and 252, for example operating array 250 at a temperature ranging from about 65 K to about 100 K while operating array 252 at a temperature ranging from about 7 K to about 12 K. At these temperatures, water and high molecular weight gases/vapors condense on array 250, forming liquid and/or solid condensate. Nitrogen, oxygen, argon and other gases having low or intermediate molecular weight condense on array 252, similarly forming condensate. Pump 220 is generally not provided with adsorption materials. Consequently, any helium or hydrogen which may be present in the process or by-product gases is not condensed in pump 220. Turbomolecular pump 275 (FIG. 2) pumps helium or hydrogen molecules, which may be present, to roughing/backing pump 278. Hydrogen (in low concentrations) and helium can be safely vented into the atmosphere. Hydrogen in high concentrations may require combustion rather than venting. This inventive process advantageously separates non-noxious effluent gases helium and hydrogen from the noxious effluent gases which are condensed inside the pump. Helium and hydrogen are thus eliminated from treatment processes which are used to remove noxious substances from the process and by-product effluent gases, thereby resulting in more effective treatment of the noxious gases. An additional benefit of this gas separation process is the improved efficiency of the novel pump. During the vacuum pumping operation of pump 220, valves 226 and 230 (FIG. 4) remain partly or completely open in order to operably connect pump 220 to vacuum fabrication chamber 210 (FIG. 2) and to turbomolecular pump 275. Typically, pumps such as pump 220 are capable of maintaining vacuum levels ranging from about $10^{-1}$ torr to about $10^{-1}$ torr depending on effluent process gas volumes and the temperature of effluent process gases entering the pump.

Regeneration of pump 220, shown in FIG. 4, is necessary when the pump's effective pumping capacity is reached due to the formation of substantial layers of condensate on the pump cooling arrays. In accordance with the present invention, vessel 280 is connected to the pump during pump regeneration, wherein valve 282 is in an open position while valves 266 and 269 are closed. Regeneration is started by closing valves 226 and 230 thereby isolating the space contained within pump housing 224. The temperature of arrays 250 and 252 is then increased, using techniques (not shown) which are well known to those of ordinary skill in the art, such as utilizing the ambient temperature outside the pump to increase the pump temperature, or the use of one or more heaters (not shown) mounted on refrigerator 242, or employing one or more heaters (not shown) affixed to the outside of housing 224. As arrays 250 and 252 warm, condensate evaporates thereby forming regenerated gases, and thus increasing the pressure of inner space 222. Valve 238 is opened during pump regeneration, thereby equilibrating the pressure of inner space 222 and the pressure inside vessel 280. Valve 238 is preferably opened at a predetermined pressure of space 222 such as atmospheric pressure or rough vacuum. Suitable valves for valve 238 include pressure relief valves which open at the predetermined pressure of space 222. Condensate evaporation inside the pump is continued until substantially all condensate has evaporated, resulting in pressures which can range from about 10,343 torr (200 psi) to about 103,430 torr (2,000 psi) inside the pump and vessel 280. The pressure depends on the type and quantity of condensate and the total volume of pump inner space 222, vessel 280 and manifold 270. Valves 238 and 282 are then closed, isolating the regenerated effluent gases inside three separate gas containing compartments: pump inner space 222, vessel 280, and manifold 270 with adjacent conduit 284.

Regenerated effluent gases can be removed from manifold 270, see FIG. 4, and conduit 284, for example by connecting a pump (not shown) to valve 269, opening valve 269 and pumping the regenerated gases to an additional storage vessel (not shown). Manifold 270 and conduit 284 can then be purged, for example by a gas entering into the manifold when valve 266 is opened. The purged gas can then be pumped through open valve 269 to an additional storage vessel. Following the removal of noxious substances from manifold 270, valve 266 or 269 is opened to provide atmospheric pressure inside the manifold, after which conduit connections 262 and 286 are disconnected to separate vessel 280 from the pump. The noxious gases which are contained in vessel 280 can then be treated on-site or at a remote location. Regenerated effluent gases remain inside the closed pump at pressures which can range from about 10,343 torr to about 103,430 torr. These gases can subsequently be condensed by conventional cooling of arrays 250 and 252 of pump 220, in preparation for the next vacuum pumping cycle.

In an alternate embodiment (not shown), a condensable gas containment system is provided including a conduit such as conduit 260 having a conduit connection adapted for mating with connection 286 of vessel 280, but not having conduits 264 and 268, and valves 266 and 269. This alternate configuration can be employed when the volume of the conduits between valves 238 and 282 is very small, particularly when the concentration of noxious gases is very low.

It will be understood that refrigerator 242 of inventive pump 220 needs to be constructed such that this refrigerator is adapted for pressures of at least about 10,343 torr inside the pump, and preferably for pressures of about 103,430 torr. Similarly, seals in the housing, such as seals around inlet 254 and outlet 256 need to be constructed to withstand these pressures. It will also be understood that valves 226, 230 and 238, and conduits 232 and 240 need to be fabricated and installed such that these components perform their respective functions effectively at pressures of at least about 10,343 torr and preferably for pressures of about 103,430 torr.

Figure 5:
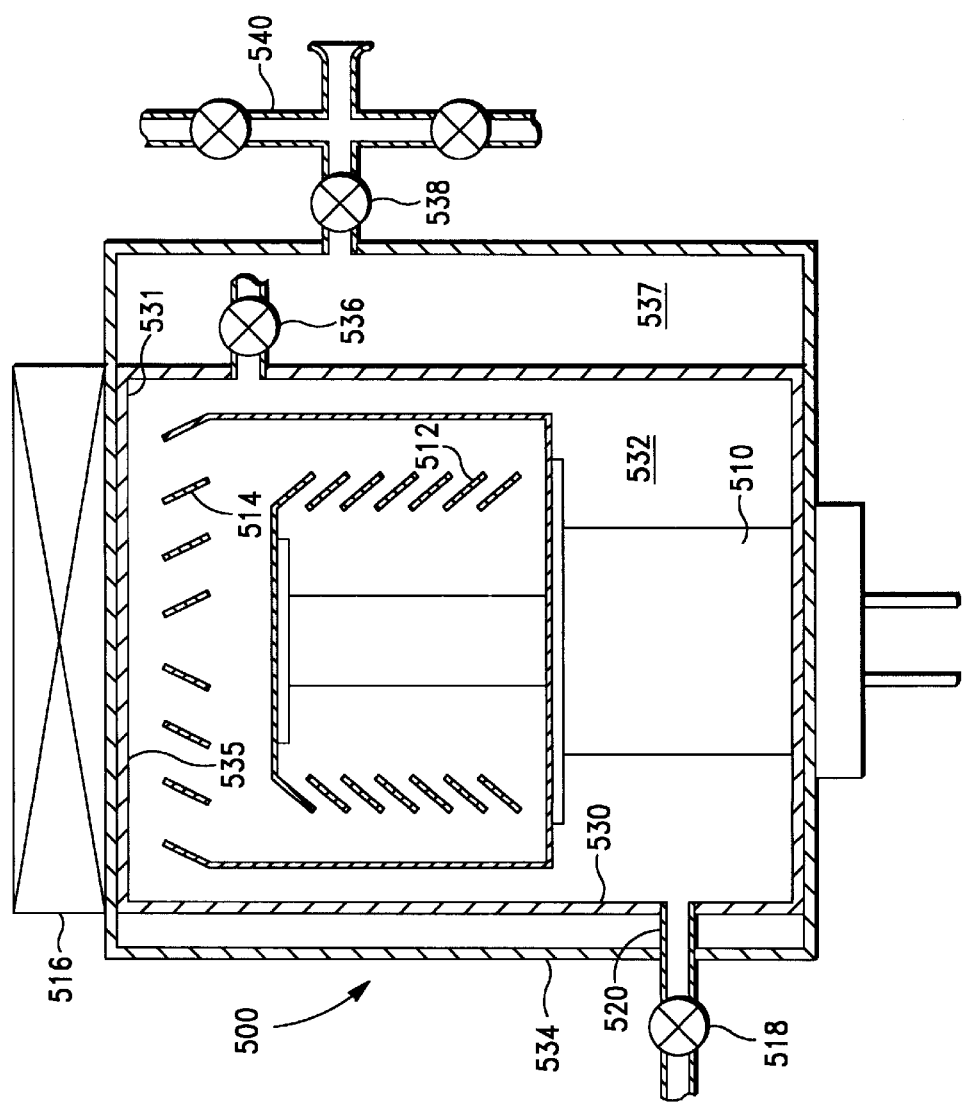
FIG. 5 is a schematic view of an alternate embodiment of a pump of the present invention illustrated in FIG. 4.

An alternate embodiment of the present invention is depicted in FIG. 5, showing novel pump 500. Arrays 512 and 514 of pump 510 are cooled by refrigerator 510 in a similar manner as arrays 250 and 252 of pump 220 (FIG. 4). Conduit 520 (FIG. 5) and valves 516 and 518 are similar to conduit 232 and valves 226 and 230 respectively of pump 220. Pump 500 is provided with a novel housing including an inner housing 530 enclosing an inner pump space 532 and an outer housing 534 which contains housing 532 therewithin. An outer pump space 537 is formed between the inner and outer housings. A valve 536 is adapted to selectively connect inner space 532 to outer space 537. Typically, valve 536 provides the only connection between space 532 and space 537. Outer housing 534 provides an envelope around inner housing 530. The inner and outer housings preferably are sealed together at rim 531 of inner housing 530, forming a port 535 between inner space 532 and valve 516. Port 535 extends through the inner and outer housings. A manifold 540 operably connects outer space 534 to a pressure vessel (not shown) similar to pressure vessel 280 (FIG. 4) of pump 220.

Novel pump 500, shown in FIG. 5, condenses effluent process gases and by-product gases on pumping surfaces (arrays) 512 and 514 in a similar manner as described in connection with inventive pump 220. Valves 516 and 518 are open during the high vacuum pumping process, while valve 536 is closed. Regeneration of pump 500 in accordance with the present invention entails closing valves 516 and 518, and increasing the temperature of arrays 512 and 514 to evaporate the condensate. When the pressure of inner space 532 has increased to a predetermined pressure, such as atmospheric pressure, valve 536 and manifold valve 538 are opened such that inner space 532 communicates with outer space 534 and with the gas containment space inside the pressure vessel (not shown). As a consequence, the pressure of inner space 532 equilibrates with the pressure of outer space 537 and the pressure inside the pressure vessel. At the completion of the regeneration process, valve 538 and the pressure vessel valve are closed. The pressure vessel can then be removed from the pump in a manner similar to the techniques described in connection with vessel 280. Novel pump 500 thus employs a novel housing having an inner and an outer housing. The inner housing is adapted for inside pressures ranging from about $10^{-1}$ torr to about atmospheric pressure, because inner pump space 532 and outer pump space 537 have the same pressure once valve 536 is opened. Preferably, the inner housing is adapted for pressures ranging from about $10^{-10}$ to about atmospheric pressure. The outer housing is adapted for inside pressures ranging from atmospheric pressure to at least about 10,343 torr, and preferably to about 103,430 torr.

While the present invention has been described in connection with pumps illustrated in FIGS. 2, 4 and 5, it is understood that the invention is equally operable when using other types of high vacuum pumps which employ a cold surface for the condensation of gases at a temperature ranging from 7 k to about 20 K, preferably ranging from about 7 K to about 12 K, provided these pumps are adapted for withstanding pressures inside the pump ranging from about $10^{-1}$ torr to at least about 10,343 torr (200 psi). More preferably, these pumps are adapted for pressures as low as about $10^{-10}$ torr and as high as about 103,430 torr (2000 psi). Cryopumps which are adapted for withstanding pressures inside the pump of at least about 10,343 torr are particularly suitable for embodiments of the present invention. Preferably, cryopumps of the present inventions are adapted for withstanding pressures inside the pump of about 103,430 torr. Also, it will be understood that the invention is operable when the novel pump is employed without using a turbo-molecular and/or roughing/backing pump.

Figure 6:
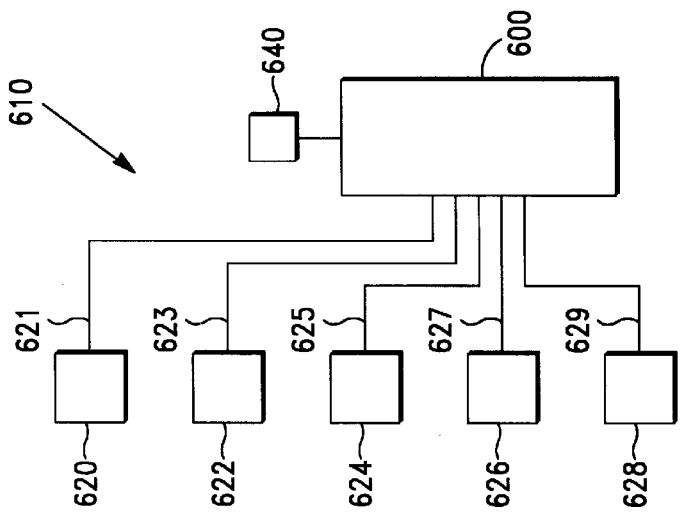
FIG. 6 is a block diagram illustrating a gas processing system of the present invention.

The novel gas processing techniques of the present invention require a sequence of unit operations. All or some of these unit operations can be integrated by means of a novel apparatus including a controller 600 illustrated in FIG. 6. Controller 600 is adapted for controlling a number of unit operations which are utilized in the inventive gas processing techniques, such as the techniques described in connection with FIGS. 2–5. As illustrated in FIG. 6, a novel gas processing system 610 includes controller 600 and a plurality of unit operations: 620, 622, 624,626 and 628. Additionally, system 610 has operative links 621, 623, 625, 627 and 629 which provide connections between controller 600 and unit operations 620, 622, 624, 626 and 628 respectively. The novel apparatus includes a data structure such as a computer program which causes controller 600 to control the processing steps of each of the unit operations and to, optionally, regulate the sequence in which the unit operations are executed in the novel gas processing techniques.

Examples of suitable controllers include conventional computers and computer systems including one or more computers which are operably connected to other computers or to a network of computers or data processing devices. Suitable computers include computers commonly known as microcomputers. The data structure which is used by controller 600 can be stored on a removable electronic data storage medium 640 (FIG. 6), such as computer floppy disks, removable computer hard disks, magnetic tapes and optical disks, to facilitate the use of the same data structure at different processing locations. Alternatively, the data structure can be stored on a non-removable electronic data storage medium, including a medium positioned at a location which is remote (not shown) from controller 600, using such data storage devices as are well known to those of ordinary skill in the art. The data structure can be communicated from a remote location to controller 600 using communication techniques which are well known to those of ordinary skill in the art including hard wire connections, wireless connections and data communication methods utilizing one or more modems or techniques using one or more computers commonly known as servers. The data storage medium can be operably connected to the controller using methods and device components which are well known to those of ordinary skill in the art. Examples of suitable unit operations for gas processing system 610 include those shown in Table A.

Table A

| Unit Operation | |
|---|---|
| 620 | condensing a gas on a cold surface inside a process chamber at a pressure below atmospheric pressure |
| 622 | closing the process chamber |
| 624 | increasing the temperature of the cold surface |
| 626 | opening the process chamber to a vessel at a predetermined pressure inside the process chamber |
| 628 | closing the vessel |

Additional unit operations can be added to system 610. As illustrated in FIG. 6, controller 600 is adapted to be connected to each of the unit operations through operative links. Each of these links provides a bidirectional connection enabling controller 600 to transfer commands from its data structure, such as specific operating parameters, and to receive information, such as test data, or operational information from the unit operation. The operative links can be in the form of hard wire connections or wireless connections.

The invention has been described in terms of the preferred embodiment. One skilled in the art will recognize that it would be possible to construct the elements of the present invention from a variety of means and to modify the placement of components in a variety of ways. While the embodiments of the invention have been described in detail and shown in the accompanying drawings, it will be evident that various further modifications are possible without departing from the scope of the invention as set forth in the following claims.

I claim:

1. A method of processing gases, the method comprising:
    a) condensing at least a first gas on a first cold surface having a predetermined first temperature, inside a pumping chamber having a predetermined first pressure which is below atmospheric pressure, thereby forming a first condensate;
    b) closing the pumping chamber;
    c) increasing the temperature of the first cold surface;
    d) evaporating at least part of the first condensate, thereby forming a regenerated gas;
    e) opening the pumping chamber to a vessel; and
    f) transferring at least a portion of the regenerated gas to the vessel.

2. The method of claim 1 additionally comprising:
    a) closing the vessel to isolate the portion of the regenerated gas;
    b) closing the pumping chamber; and
    c) removing the vessel from the pumping chamber.

3. The method of claim 2 additionally comprising:
    a) connecting the vessel to a treatment facility for removal of one or more noxious substances from the regenerated gas; and
    b) treating the regenerated gas to remove the noxious substances.

4. The method of claim 1 wherein the predetermined first temperature ranges from about 7 K to about 20 K.

5. The method of claim 1 wherein the predetermined first pressure ranges from about $10^{-1}$ torr to about $10^-$ torr.

6. The method of claim 1 wherein opening the pumping chamber to a vessel comprises opening the process chamber at a predetermined second pressure.

7. The method of claim 6 wherein the predetermined second pressure ranges from subatmospheric to atmospheric.

8. The method of claim 1 additionally comprising condensing at least a second gas on a second cold surface, having a predetermined second temperature, inside the pumping chamber.

9. The method of claim 8 wherein:
    a) the predetermined first temperature ranges from about 7 K to about 20 K; and
    b) the predetermined second temperature ranges from about 50 K to about 100 K.

10. The method of claim 1 wherein the pumping chamber has a housing which is adapted for an inside pressure ranging from about $10^{-1}$ torr to at least about 10,343 torr.

11. The method of claim 1 wherein condensing a first gas comprises condensing one or more gases selected from the group consisting of semiconductor vacuum fabrication process gases and by-product gases.

12. The method of claim 1 wherein condensing a first gas is preceded by opening the pumping chamber to a vacuum fabrication chamber.

13. The method of claim 1 wherein condensing a first gas additionally comprises:
    a) opening the pumping chamber to a vacuum pump prior to closing the pumping chamber; and
    b) transferring one or more gases selected from the group consisting of helium and hydrogen, from the pumping chamber to the vacuum pump.

14. An apparatus for processing gases, the apparatus comprising:
    a) a housing adapted for an inside pressure ranging from about $10^{-1}$ torr to at least about 10,343 torr, wherein the housing encloses a first inner space;
    b) a first cooling surface adapted for cooling at a predetermined first temperature, wherein the first cooling surface is positioned inside the first inner space;
    c) a first valve adapted for selectively admitting gases into the first inner space; and
    d) a second valve adapted for selectively transferring gases from the first inner space to a gas containment space.

15. The apparatus of claim 14 additionally comprising a third valve adapted for selectively passing gases from the first inner space to a vacuum pump.

16. The apparatus of claim 14 wherein the first and second valves are adapted for operating at a pressure of at least about 10,343 torr.

17. The apparatus of claim 14 wherein the first cooling surface comprises a cryopump array.

18. The apparatus of claim 14 additionally comprising a second cooling surface adapted for cooling at a second predetermined temperature wherein the second cooling surface is positioned inside the first inner space.

19. The apparatus of claim 14 wherein the first valve selectively admits one or more gases from a vacuum fabrication chamber.

20. An apparatus for processing gases, the apparatus comprising:
    a) an inner housing enclosing an inner space, wherein the inner housing is adapted for a first inside pressure ranging from about $10^{-1}$ torr to about atmospheric;
    b) an outer housing enclosing an outer space between the inner housing and the outer housing, wherein the outer housing is adapted for a second pressure ranging from subatmospheric to at least about 10,343 torr; and
    c) a first cooling surface adapted for cooling at a predetermined first temperature, wherein the first cooling surface is positioned inside the inner housing.

21. The apparatus of claim 20, additionally comprising a gas containment space including a removable storage vessel, wherein the gas containment space is adapted for operably connecting to the outer space.

22. The apparatus of claim 20 wherein the outer housing provides an envelope around the inner housing.

23. The apparatus of claim 20 additionally comprising a valve for selectively connecting the inner space to the outer space.

24. The apparatus of claim 20 additionally comprising a second cooling surface adapted for cooling at a second predetermined temperature, wherein the second cooling surface is positioned inside the inner housing.

25. An apparatus for processing gases, the apparatus comprising:
   a) a housing adapted for an inside pressures ranging from about $10^{-1}$ torr to at least about 10,343 torr, wherein the housing encloses a first inner space;
   b) a first cooling surface adapted for cooling at a predetermined first temperature, wherein the first cooling surface is positioned inside the first inner space;
   c) a first valve adapted for selectively admitting gases into the first inner space;
   d) a second valve adapted for selectively transferring gases from the first inner space to a gas containment space; and
   e) the gas containment space comprising a removable storage vessel.

26. The apparatus of claim 25 wherein the vessel is removably attached to the second valve, such that the vessel is adapted for communicating the first inner space with the gas containment space.

27. An apparatus for processing gases comprising a cryopump adapted for inside pressures of at least about 10,343 torr.

28. The apparatus of claim 27 wherein the cyopump is adapted for inside pressures of about 103,430 torr.

29. The apparatus of claim 27 wherein the cryopump is operably connected to a gas containment space.

30. The apparatus of claim 29 wherein the gas containment space comprises a pressure vessel.

31. The apparatus of claim 29 wherein the gas containment space is adapted for inside pressures of at least about 10,343 torr.

32. An apparatus for controlling the processing of one or more gases, the apparatus comprising:
   a) at least one controller adapted for interacting with a plurality of unit operations including: (1) a first unit operation for condensing a gas on a cold surface inside a pumping chamber at a pressure below atmospheric pressure, (2) a second unit operation for closing the pumping chamber, (3) a third unit operation for increasing the temperature of the cold surface, (4) a fourth unit operation for opening the pumping chamber to a vessel at a predetermined pressure inside the pumping chamber and (5) a fifth unit operation for closing the vessel; and
   b) a data structure which causes the controller to control the processing of the gases.

33. An apparatus for processing gases, the apparatus comprising:
   a) a cryopump adapted for inside pressures of at least 10,343 torr; and
   b) a removable gas containment space, wherein the containment space is operably connected to the cryopump.

* * * * *